US011951859B2

(12) United States Patent
Kimura et al.

(10) Patent No.: US 11,951,859 B2
(45) Date of Patent: Apr. 9, 2024

(54) NAVIGATION SERVER, NON-TRANSITORY STORAGE MEDIUM, AND NAVIGATION SYSTEM

(71) Applicant: TOYOTA JIDOSHA KABUSHIKI KAISHA, Toyota (JP)

(72) Inventors: Ayano Kimura, Susono (JP); Hikaru Shiozawa, Susono (JP); Toshiya Hashimoto, Miyoshi (JP); Chuya Ogawa, Susono (JP); Yuta Maniwa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 239 days.

(21) Appl. No.: 17/462,942

(22) Filed: Aug. 31, 2021

(65) Prior Publication Data

US 2022/0118871 A1 Apr. 21, 2022

(30) Foreign Application Priority Data

Oct. 21, 2020 (JP) ................................. 2020-176972

(51) Int. Cl.
*B60L 53/35* (2019.01)
*B60L 53/126* (2019.01)
*G01C 21/34* (2006.01)

(52) U.S. Cl.
CPC ............. *B60L 53/35* (2019.02); *B60L 53/126* (2019.02); *G01C 21/3476* (2013.01); *B60L 2240/54* (2013.01)

(58) Field of Classification Search
CPC .... B60L 53/35; B60L 53/126; B60L 2240/54; G01C 21/3476
See application file for complete search history.

(56) References Cited

U.S. PATENT DOCUMENTS

| 2012/0249068 | A1* | 10/2012 | Ishida ..................... B60L 55/00 320/109 |
| 2013/0079962 | A1* | 3/2013 | Ishikawa ............. B60L 15/2045 701/22 |
| 2013/0096751 | A1* | 4/2013 | Riley ...................... B60L 53/63 706/46 |
| 2020/0234575 | A1* | 7/2020 | Hishida ................ G08G 1/0145 |
| 2021/0053458 | A1* | 2/2021 | Fujiwara ................. B60L 50/50 |

(Continued)

FOREIGN PATENT DOCUMENTS

| JP | 2003-148983 A | 5/2003 |
| JP | 2005-207933 A | 8/2005 |

(Continued)

*Primary Examiner* — Kira Nguyen
(74) *Attorney, Agent, or Firm* — Oliff PLC

(57) ABSTRACT

A navigation server includes a processor. The processor is configured to derive one of a first route and a second route as a route from a place of departure to a destination of a vehicle in accordance with a remaining level of a travel battery of the vehicle. The first route includes a first road provided with a first non-contact electric power feeder. The second route includes a second road provided with a second non-contact electric power feeder that is different in electric power feed capability from the first non-contact electric power feeder. The processor is configured to output the derived route as a recommended route to a terminal associated with the vehicle.

14 Claims, 6 Drawing Sheets

(56) References Cited

U.S. PATENT DOCUMENTS

2021/0370794 A1* 12/2021 Dudar .................. B60L 53/126
2022/0134893 A1*  5/2022 Liu ........................ B60L 53/57
                                                        320/109

FOREIGN PATENT DOCUMENTS

| JP | 2013-228238 A | 11/2013 |
| JP | 2014-240757 A | 12/2014 |
| WO | 2011/142421 A1 | 11/2011 |

* cited by examiner

NAVIGATION SERVER, NON-TRANSITORY STORAGE MEDIUM, AND NAVIGATION SYSTEM

CROSS-REFERENCE TO RELATED APPLICATION

This application claims priority to Japanese Patent Application No. 2020-176972 filed on Oct. 21, 2020, incorporated herein by reference in its entirety.

BACKGROUND

1. Technical Field

The present disclosure relates to a navigation server, a navigation program, and a navigation system.

2. Description of Related Art

In WO2011/142421, a resonance-type non-contact electric power feed system for vehicles is disclosed. The system includes a plurality of feeding lanes diverted from a vehicle travel path, and non-contact electric power feeders provided along the feeding lanes.

SUMMARY

When a plurality of route candidates are present as a route from a place of departure to a destination, the route candidates each include roads provided with non-contact electric power feeders, and the non-contact electric power feeders are different in electric power feed capability, it is expected to guide a recommended route based on the remaining battery level of a vehicle and the electric power feed capability of the non-contact electric power feeders.

The present disclosure has been made in view of the above-stated circumstances, and an object of the present disclosure is to provide a navigation server, a navigation program, and a navigation system capable of guiding a recommended route from a place of departure to a destination based on the remaining level of a travel battery of a vehicle and the electric power feed capability of a non-contact electric power feeder.

The navigation server according to the present disclosure includes a processor. The processor is configured to derive one of a first route and a second route as a route from a place of departure to a destination of a vehicle in accordance with a remaining level of a travel battery of the vehicle. The first route includes a first road provided with a first non-contact electric power feeder. The second route includes a second road provided with a second non-contact electric power feeder that is different in electric power feed capability from the first non-contact electric power feeder. The processor is configured to output the derived route as a recommended route to a terminal associated with the vehicle.

A navigation program according to the present disclosure causes a processor to execute: deriving one of a first route and a second route as a route from a place of departure to a destination of a vehicle in accordance with a remaining level of a travel battery of the vehicle, the first route including a first road provided with a first non-contact electric power feeder, and the second route including a second road provided with a second non-contact electric power feeder that is different in electric power feed capability from the first non-contact electric power feeder; and outputting the derived route as a recommended route to a terminal associated with the vehicle.

A navigation system according to the present disclosure includes a terminal and a navigation server. The terminal includes a first processor, the terminal being associated with a vehicle. The navigation server includes a second processor. The second processor is configured to derive one of a first route and a second route as a route from a place of departure to a destination of a vehicle in accordance with a remaining level of a travel battery of the vehicle. The first route includes a first road provided with a first non-contact electric power feeder. The second route includes a second road provided with a second non-contact electric power feeder that is different in electric power feed capability from the first non-contact electric power feeder. The second processor is configured to output the derived route as a recommended route to the terminal associated with the vehicle.

According to the present disclosure, it is possible to guide a recommended route from a place of departure to a destination based on the remaining level of a travel battery of a vehicle and the electric power feed capability of a non-contact electric power feeder.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, embodiments of a navigation server, a navigation program, and a navigation system according to the present disclosure will be described. The embodiments are not intended to limit the present disclosure.

Figure 1:
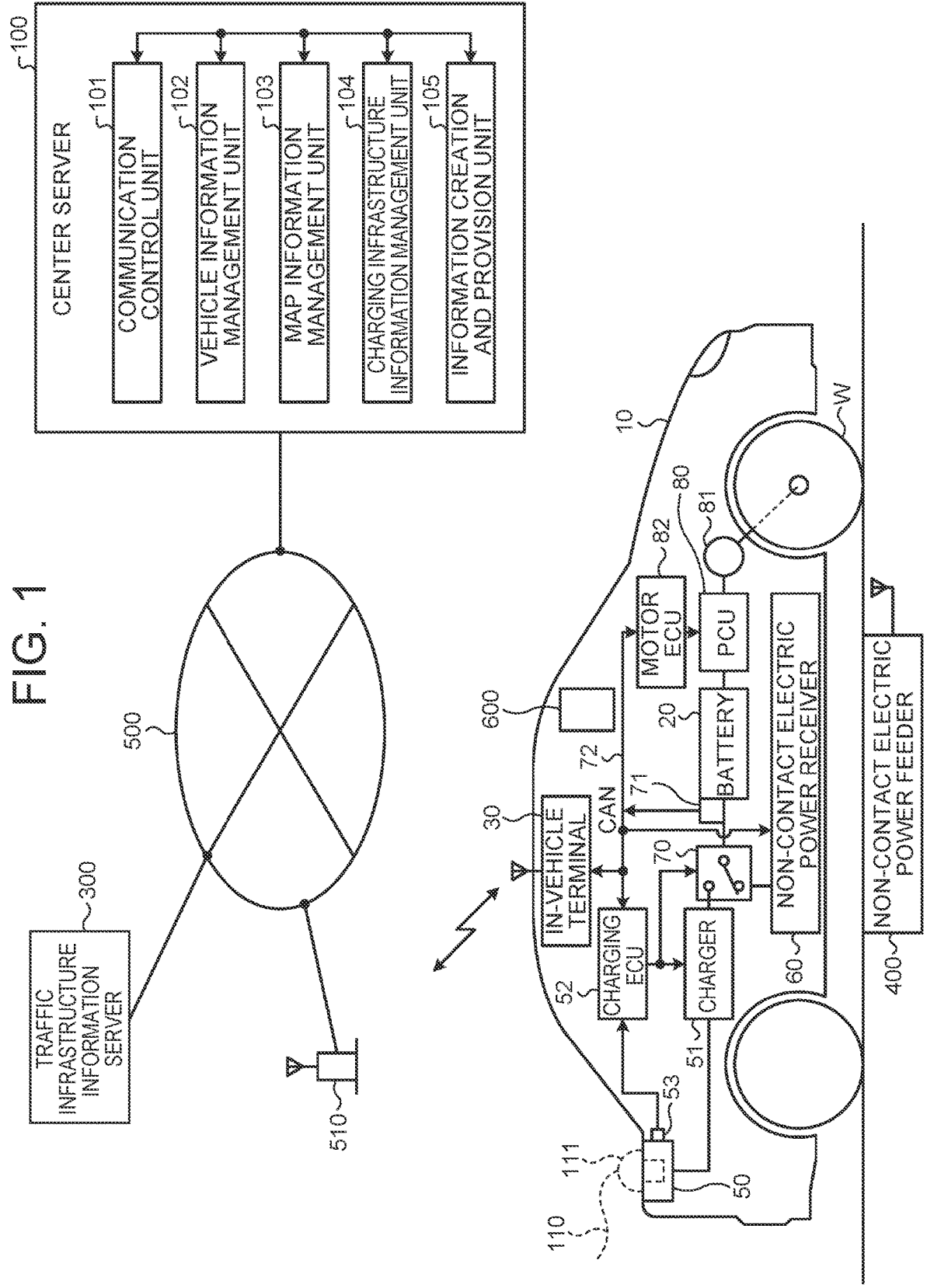
FIG. 1 shows a car navigation system according to an embodiment.

FIG. 1 shows a car navigation system according to an embodiment. A vehicle 10, applicable to the car navigation system, is an electric vehicle that travels by driving a travel motor powered by a battery.

The car navigation system includes an in-vehicle terminal 30, a center server 100, a charging infrastructure information server 300, a non-contact electric power feeder 400, and a communication network 500. The in-vehicle terminal 30 is an in-vehicle information communication terminal device associated with the vehicle 10. The center server 100 functions as a navigation server provided in a vehicle information center. The charging infrastructure information server 300 is provided in a charging infrastructure center. The non-contact electric power feeder 400 is provided on a road that is a travel path of the vehicle 10. The communication network 500 is the Internet or the like, which connects the in-vehicle terminal 30, the center server 100, the charging infrastructure information server 300, and the non-contact electric power feeder 400 so as to be communicable with each other. The communication network 500 is connected to a wireless base station 510. The in-vehicle terminal 30 is connected to the communication network 500 via the wireless base station 510.

The vehicle 10 has a battery 20 as an energy source for traveling. The vehicle 10 has two electric power feed systems: a cable-connected feed system that feeds electric power to the battery 20 from an external power source via a charging cable 110; and a non-contact electric power feed system that receives electric power transmitted from the non-contact electric power feeder 400 and feeds the electric power to the battery 20 in a non-contact fashion.

The cable-connected electric power feed system includes a reception port 50, a charger 51, and a charging electronic control unit (ECU) 52. The reception port 50 is a connection point for a connection plug 111 of the charging cable 110. The charger 51 charges the battery 20 by converting electric power supplied to the reception port 50 into electric power for charging the battery 20. The charging ECU 52 is a charging controller that controls charging of the battery 20 by the charger 51. The non-contact electric power feed system includes a non-contact electric power receiver 60. The output of the charger 51, which is the output of the cable-connected electric power feed system, and the output of the non-contact electric power receiver 60 are connected to input terminals of a selector switch 70, respectively. One of the outputs is selectively connected to a charging path to the battery 20.

The battery 20 includes a state of charge (SOC) detector 71 that detects a SOC that is a value indicating the state of charge of the battery 20. The SOC detector 71 outputs to a controller area network (CAN) communication line 72 of a CAN communication system a signal indicating a value serving as an index of the amount of electrical energy that can be output from the battery 20 as a SOC at a prescribed cycle. Hereinafter, the SOC detected by the SOC detector 71 is also referred to as a remaining battery level. For example, the remaining battery level may be expressed as a charge percentage [%], or may be expressed as the amount of electrical energy that can be output from the battery 20.

The charging ECU 52 is configured with a microcomputer including a processor that is constituted of a central processing unit (CPU), a field-programmable gate array (FPGA) or the like, and a memory that is constituted of a random-access memory (RAM), a read-only memory (ROM) or the like. At the time of charging the battery 20, the charging ECU 52 acquires the remaining battery level detected by the SOC detector 71 from the CAN communication line 72, and charges the battery 20 by operating the charger 51 until the remaining battery level reaches a target value (for example, a fully charged level) set by a user. The charging ECU 52 also switches the selection state of the selector switch 70 such that the cable-connected electric power feed system is electrically connected to the battery 20 when the connection plug 111 of the charging cable 110 is attached to the reception port 50. The charging ECU 52 also switches the selection state of the selector switch 70 such that the non-contact electric power feed system is electrically connected to the battery 20 when the connection plug 111 of the charging cable 110 is not attached to the reception port 50. The reception port 50 has a detection switch 53 provided to detect that the connection plug 111 is connected. The charging ECU 52 receives input of the detection signal of the detection switch 53 to determine the connection of the connection plug 111, and controls the selector switch 70.

The vehicle 10 includes a power control unit (PCU) 80, a travel motor 81, and a motor ECU 82 as component members of a travel driving system. The PCU 80 converts direct-current electric power output from the battery 20 into three-phase alternating-current electric power. The motor 81 is driven by the three-phase alternating-current electric power output from the PCU 80 to rotate wheels W. The motor ECU 82 is a motor control unit that controls the output of the PCU 80 in response to driving operation of the driver. The motor ECU 82 is configured with a microcomputer including a processor that is constituted of a CPU, an FPGA or the like, and a memory that is constituted of a RAM, a ROM or the like.

Figure 2:
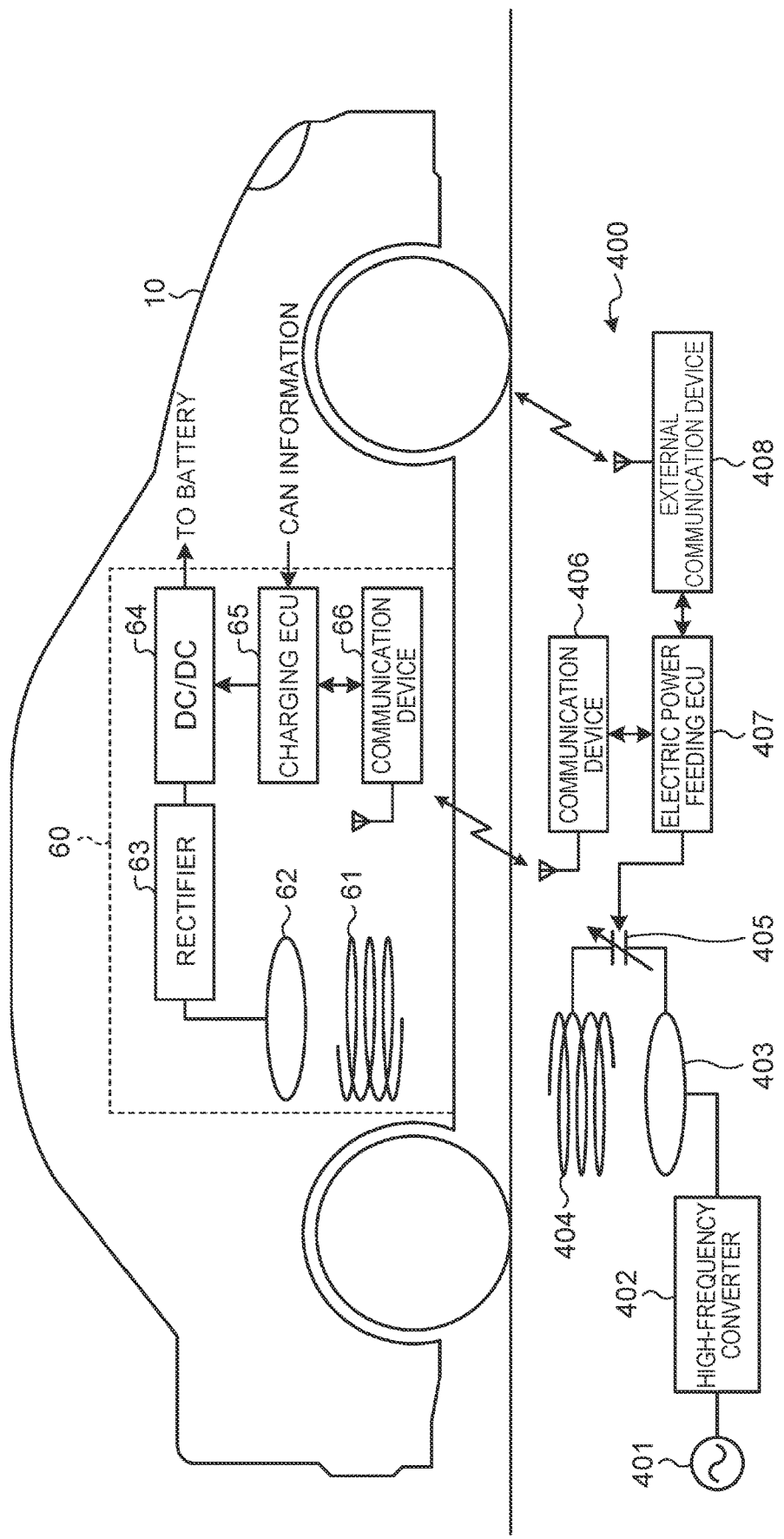
FIG. 2 is a schematic configuration diagram of a non-contact electric power receiver and a non-contact electric power feeder.

FIG. 2 is a schematic configuration diagram of the non-contact electric power receiver 60 and the non-contact electric power feeder 400. The non-contact electric power receiver 60 provided in the non-contact electric power feed system receives electric power from the non-contact electric power feeder 400 provided on the road in a non-contact fashion. The non-contact electric power feeder 400 includes an alternate-current electric power source 401, a high-frequency converter 402, an electromagnetic induction coil 403, a primary resonance coil 404, a variable capacitor 405, a communication device 406, an electric power feeding ECU 407 that is an electric power feeding controller, and an external communication device 408. The electric power feeding ECU 407 is configured with a microcomputer including a processor that is constituted of a CPU, an FPGA or the like, and a memory that is constituted of a RAM, a ROM or the like.

For example, the alternate-current electric power source 401 is a system power source supplied by an electric company. The high-frequency converter 402 converts the electric power supplied from the alternate-current electric power source 401 into electric power of a prescribed frequency, and outputs the converted electric power to the electromagnetic induction coil 403. The electromagnetic induction coil 403 is coaxially disposed with the primary resonance coil 404. Since the electromagnetic induction coil 403 can be coupled magnetically with the primary resonance coil 404 through electromagnetic induction, the high-frequency electric power supplied from the high-frequency converter 402 is output to the primary resonance coil 404 through the electromagnetic induction.

The primary resonance coil 404 is an LC resonant coil, which is configured to be able to transmit electric power to the vehicle 10 by resonating with a secondary resonance coil 61 of the non-contact electric power receiver 60 mounted on the vehicle 10 via an electromagnetic field. The variable capacitor 405 is provided to change the electrostatic capacitance of a resonance system formed with the primary resonance coil 404 and the secondary resonance coil 61 of the non-contact electric power receiver 60.

The communication device 406 is provided to receive the detected value of the position of the vehicle 10 that is fed with electric power, that is more specifically, the position of the secondary resonance coil 61 of the non-contact electric power receiver 60 mounted on the vehicle 10, and to receive the detected value of the speed of the vehicle 10. The communication device 406 receives the detected values of the position and the speed of the vehicle 10 transmitted wirelessly from a communication device 66 provided in the non-contact electric power receiver 60.

When the vehicle 10 is fed with electric power from the non-contact electric power feeder 400, the electric power feeding ECU 407 changes the electrostatic capacitance of the resonance system formed with the primary resonance coil 404 and the secondary resonance coil 61 of the non-contact electric power receiver 60 in accordance with the detected values of the position and the speed of the vehicle 10 received by the communication device 406. As the distance between the primary resonance coil 404 and the secondary resonance coil 61 of the non-contact electric power receiver 60 changes, the electrostatic capacitance between the primary resonance coil 404 and secondary resonance coil 61 changes, which results in changes in resonance frequency of the resonance system. When the resonance frequency largely deviates from the frequency of the transmitted electric power, that is, the frequency of the high-frequency electric power generated by the high-frequency converter 402, the efficiency of electric power transmission is significantly reduced. Accordingly, the electric power feeding ECU 407 controls the variable capacitor 405 to approximate the resonance frequency of the resonance system to the frequency of the high-frequency electric power generated by the high-frequency converter 402 in accordance with the detected values of the position and speed of the vehicle 10, and thereby adjusts the electrostatic capacitance of the resonance system. For example, the electric power feeding ECU 407 adjusts the electrostatic capacitance of the variable capacitor 405 to be smaller as the vehicle speed is higher. The electric power feeding ECU 407 adjusts the electrostatic capacitance of the variable capacitor 405 to be smaller as the vehicle 10 is farther away from the non-contact electric power feeder 400 (as the distance between the primary resonance coil 404 and the secondary resonance coil 61 is larger).

The external communication device 408 transmits information, such as the operational status of the non-contact electric power feeder 400, to the charging infrastructure information server 300 via the communication network 500 at a prescribed cycle. In this case, the external communication device 408 transmits operational status information (information indicating whether or not electric power feed is available) with an identification ID appended that identifies the non-contact electric power feeder 400. A large number of non-contact electric power feeders 400 are provided on the road. Accordingly, the charging infrastructure center can recognize which non-contact electric power feeder 400 is in operation within its jurisdiction. Hereinafter, the position where the non-contact electric power feeders 400 are disposed is referred to as a non-contact electric power feed position. In order to increase the amount of electric power fed to the traveling vehicle 10, two or more non-contact electric power feeders 400 are consecutively provided at one non-contact electric power feed position.

Meanwhile, the non-contact electric power receiver 60 mounted on the vehicle 10 includes the secondary resonance coil 61, an electromagnetic induction coil 62, a rectifier 63, a DC-DC converter 64, a charging ECU 65 that is a charging controller, and the communication device 66. The charging ECU 65 is configured with a microcomputer including a processor that is constituted of a CPU, an FPGA or the like, and a memory that is constituted of a RAM, a ROM or the like.

The secondary resonance coil 61 is an LC resonant coil, which is configured to be able to receive electric power from the non-contact electric power feeder 400 by resonating with the primary resonance coil 404 of the non-contact electric power feeder 400 via an electromagnetic field. The electromagnetic induction coil 62 is coaxially disposed with the secondary resonance coil 61. Since the electromagnetic induction coil 62 can be coupled magnetically with the secondary resonance coil 61 through electromagnetic induction, the electric power received by the secondary resonance coil 61 through electromagnetic induction is taken out and output to the rectifier 63. The rectifier 63 rectifies the alternating-current electric power output from the electromagnetic induction coil 62, and outputs the rectified electric power to the DC-DC converter 64. The DC-DC converter 64 converts the voltage level of the electric power rectified by the rectifier 63 to a voltage level for charging the battery 20, and outputs the converted electric power to the battery 20. At the time of receiving electric power from the non-contact electric power feeder 400, the charging ECU 65 charges the battery 20 by driving the DC-DC converter 64. The charging ECU 65 also acquires information indicating a vehicle speed and an own vehicle position from the CAN communication line 72, and outputs the information indicating the vehicle speed and the own vehicle position to the communication device 66. The communication device 66 transmits the information indicating the vehicle speed and the own vehicle position wirelessly to the external communication device 408 of the non-contact electric power feeder 400.

Figure 3:
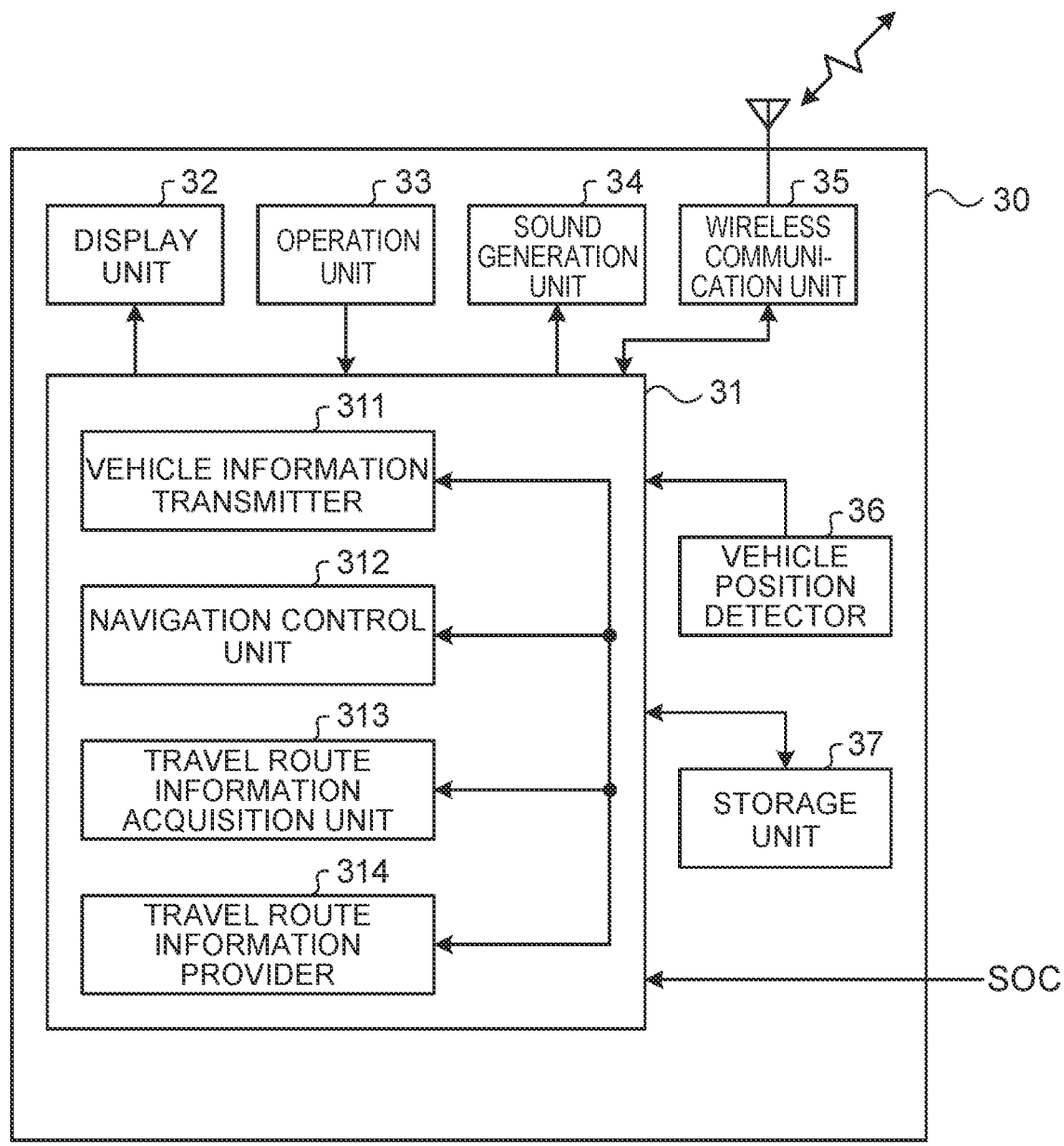
FIG. 3 is a schematic configuration diagram of an in-vehicle terminal.

Next, the in-vehicle terminal 30 will be described. FIG. 3 is a schematic configuration diagram of the in-vehicle terminal 30. The in-vehicle terminal 30 includes a main control unit 31, a display unit 32, an operation unit 33, a sound generation unit 34, a wireless communication unit 35, a vehicle position detector 36 and a storage unit 37. The main control unit 31 is configured with a microcomputer including a processor that is constituted of a CPU, an FPGA or the like, and a memory that is constituted of a RAM, a ROM or the like. The display unit 32 and the operation unit 33 are configured with touch panel displays such as liquid crystal or organic EL displays. The sound generation unit 34 is configured with an amplifier and a speaker for voice guidance. The wireless communication unit 35 communicates with the outside via the wireless base station 510. The vehicle position detector 36 includes a GPS unit that detects the current position coordinates of the vehicle based on radio waves from GPS satellites, and a gyro sensor that detects the direction of travel of the vehicle 10. The storage unit 37 is configured with a storage device such as an erasable programmable ROM (EPROM), and a hard disk drive (HDD). The storage unit 37 stores information such as map information, facility information, and various vehicle characteristics.

The vehicle 10 is provided with a plurality of vehicle ECUs that are electronic controllers that control the state of the vehicle. The vehicle ECUs, including the charging ECUs 52, 65 and the motor ECU 82, and the SOC detector 71 are connected to the CAN communication line 72, and transmit various vehicle information (e.g., travel distance information, SOC information, vehicle diagnostic information, and various request information) to the CAN communication line 72. Therefore, the vehicle ECUs are configured to be able to share the vehicle information via the CAN communication line 72. The in-vehicle terminal 30 is also connected to the CAN communication line 72. The in-vehicle terminal 30 transmits the vehicle information, which is transmitted to the CAN communication line 72, to the center server 100 based on predetermined procedures. The center server 100 transmits service information useful for the user to the in-vehicle terminal 30 based on the vehicle information transmitted from the in-vehicle terminal 30 and external information acquired from the outside.

Hereinafter, in relation to the functions of the in-vehicle terminal 30 and the center server 100, the configuration relating to setting a recommended route from a place of departure to a destination, and suggesting the recommended route to the user will be described.

The main control unit 31 provided in the in-vehicle terminal 30 includes a vehicle information transmitter 311, a navigation control unit 312, a travel route information acquisition unit 313, and a travel route information provider 314. The vehicle information transmitter 311 transmits information on the own vehicle (e.g., current position information, SOC information, electric cost information, and vehicle diagnostic information) and various request commands to the center server 100 along with the vehicle ID (the ID identifying the vehicle 10 or the in-vehicle terminal 30). The navigation control unit 312 guides the own vehicle to the destination set by the user based on the map information stored in the storage unit 37 and the position of the own vehicle detected by the vehicle position detector 36. The travel route information acquisition unit 313 acquires travel route information (recommended route information) and detailed information related to the travel route information (recommended route information) transmitted from the center server 100. The travel route information provider 314 provides the travel route information (recommended route information) and the detailed information related to the travel route information (recommended route information) acquired by the travel route information acquisition unit 313 to the user using the display unit 32. The vehicle information transmitter 311, the navigation control unit 312, the travel route information acquisition unit 313, and the travel route information provider 314 are implemented by executing microcomputer control programs (navigation programs).

The center server 100 includes, as main components, a microcomputer including a processor that is constituted of a CPU, an FPGA or the like and a memory that is constituted of a RAM, a ROM or the like, and a storage device such as an EPROM and a hard disk drive. As shown in FIG. 1, the center server 100 includes a communication control unit 101, a vehicle information management unit 102, a map information management unit 103, a charging infrastructure information management unit 104, and an information creation and provision unit 105. The communication control unit 101 is connected to the communication network 500 for communication control. The vehicle information management unit 102 stores and manages vehicle information in conjunction with user information. The map information management unit 103 stores and manages road map information. The charging infrastructure information management unit 104 stores and manages information related to the infrastructure of charging facilities. The information creation and provision unit 105 creates and provides information useful for users.

The charging infrastructure information server 300 includes, as main components, a microcomputer including a processor that is constituted of a CPU, an FPGA or the like and a memory that is constituted of a RAM, a ROM or the like. The charging infrastructure information server 300 collects the latest operational status from charging facilities (for example, facilities that charge the batteries, such as the non-contact electric power feeders 400 and electric power feed stations), and creates charging infrastructure information indicating the operational statuses of the respective charging facilities. The charging infrastructure information server 300 then transmits the created charging infrastructure information to the center server 100 in real time via the communication network 500. In the center server 100, the charging infrastructure information management unit 104 stores and updates the latest charging infrastructure information transmitted from the charging infrastructure information server 300. The charging infrastructure information management unit 104 of the center server 100 stores the positions of the charging facilities on the map in relation to the map information stored in the map information management unit 103. The charging infrastructure information management unit 104 also stores electric power feed capability information for each of the non-contact electric power feeders 400. The electric power feed capability information sets the amount of electric power feedable to the vehicle 10 when the vehicle 10 passes the non-contact electric power feed position at vehicle speeds assumed in advance.

The car navigation system according to the embodiment has a function to suggest the user a travel route that allows arrival at the destination by passing through the non-contact electric power feed position without having to stop at electric power feed stations. This means that the car navigation system has a function to suggest the user a travel route that allows arrival at the destination only with non-contact charging without the need for cable-connected charging. The car navigation system according to the embodiment provides a service to suggest the user a travel route that allows arrival at the destination only with non-contact charging. The service is performed by the in-vehicle terminal 30 and the center server 100 in cooperation. Hereinafter, processing to suggest the user a travel route that allows arrival at the destination only with the non-contact charging will be described.

Figure 4:
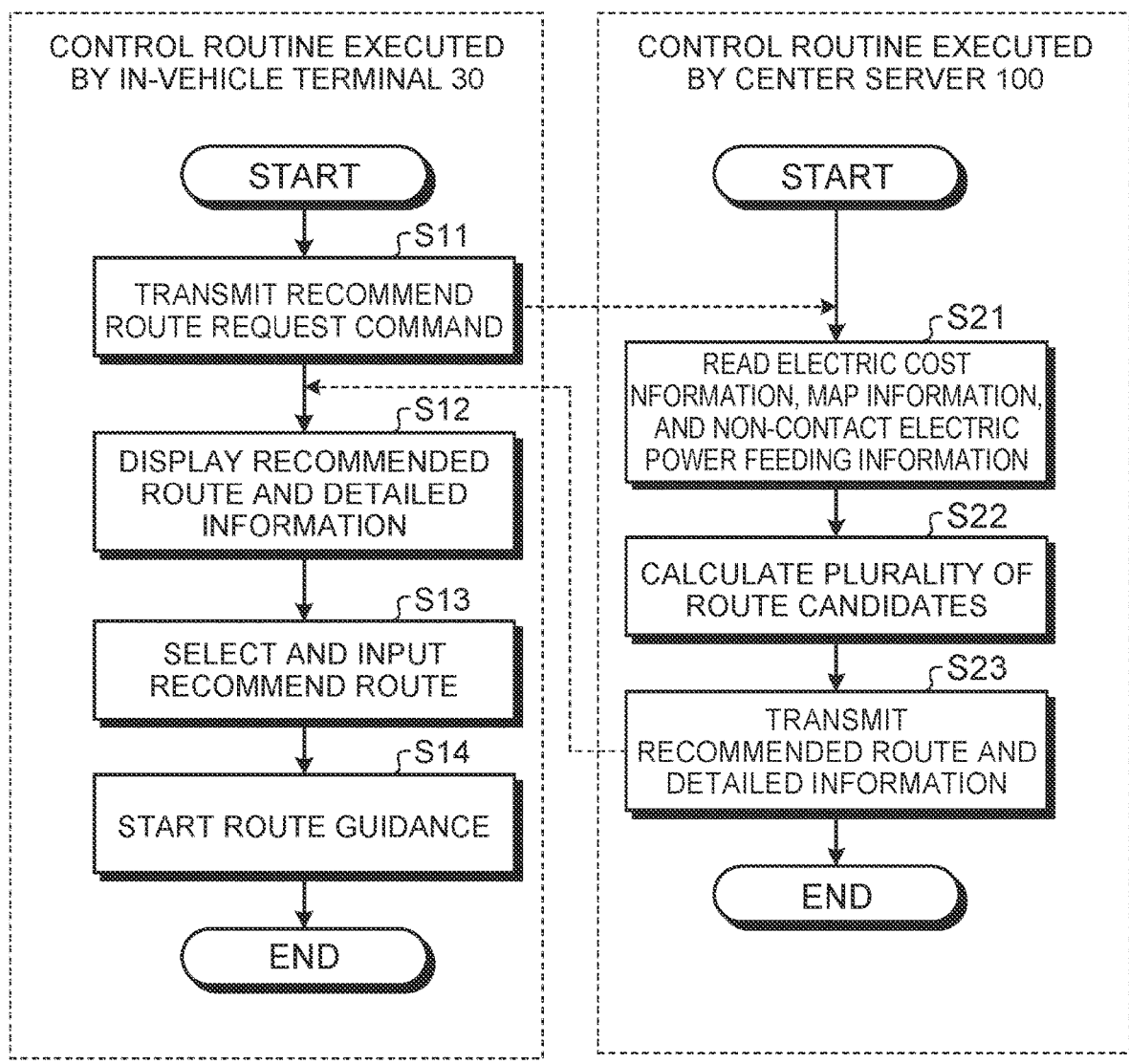
FIG. 4 shows a travel route suggestion control routine.

FIG. 4 shows a travel route suggestion control routine. The travel route suggestion control routine shown in FIG. 4 is performed by the in-vehicle terminal 30 and the center server 100 in cooperation. The travel route suggestion control routine is constituted of a control routine executed by the in-vehicle terminal 30 and a control routine executed by the center server 100. The in-vehicle terminal 30 starts the travel route suggestion control routine when the user sets a destination in the state where a non-contact charging priority mode is selected to give priority to the non-contact charging over the cable-connected charging.

When the routine is started, the in-vehicle terminal 30 (main control unit 31) transmits a recommended route request command to the center server 100 in step S11. In this case, the in-vehicle terminal 30 acquires information indicating the remaining battery level that is periodically transmitted to the CAN communication line 72, information indicating the position of the own vehicle detected by the vehicle position detector, and information indicating the destination set by the user in the operation unit 33. The in-vehicle terminal 30 then transmits vehicle-side information, including the above information and the vehicle ID, to the center server 100 as an appendage to the recommended route request command.

When the center server 100 (information creation and provision unit 105) receives a recommended route request command from the in-vehicle terminal 30, the center server 100 reads in step S21 map information about the roads present between the place of departure (the position of the own vehicle when the destination is set) and the destination, as well as operational information on the non-contact electric power feeders 400 provided on the roads (information indicating whether the non-contact electric power feeders 400 are in operation or in fault) and non-contact electric power feed information indicating the detailed information (such as the electric power feed capability) of the non-contact electric power feeders 400, based on electric cost information for the corresponding vehicle model stored in the vehicle information management unit 102, the map information stored in the map information management unit 103, and the charging infrastructure information stored in the charging infrastructure information management unit 104. Next, in step S22, the center server 100 calculates a plurality of route candidates that are candidates for the travel route from the place of departure to the destination based on the map information.

Figure 5:
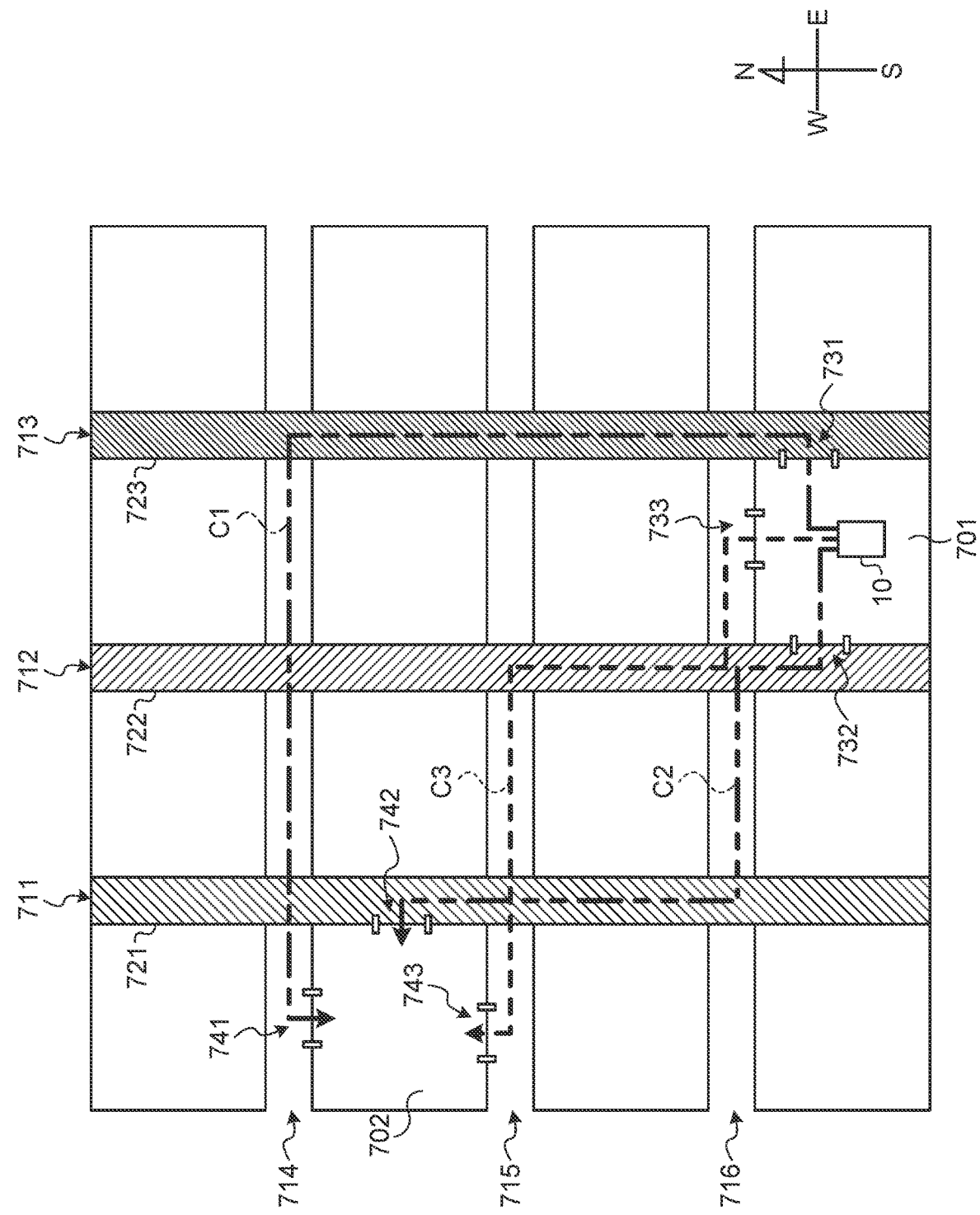
FIG. 5 is an explanatory view showing travel routes.

Here, with reference to FIG. 5, the route candidates for the vehicle 10 from a place of departure 701 to a destination 702 will be described. FIG. 5 is an explanatory view showing the route candidates from the place of departure 701 to the destination 702. As shown in FIG. 5, consider the case where the route candidates are present for the route from the place of departure 701 to the destination 702. For example, the place of departure 701 is a parking place of a collective housing. For example, the destination 702 is a parking place of a shopping center. In FIG. 5, three route candidates, for example, route A, route B, and route C, are derived as the route from the place of departure 701 to the destination 702.

In FIG. 5, a plurality of areas are defined by three roads extending from north to south and three roads extending from east to west. The place of departure 701 and the destination 702 are each set in one of the areas. The three roads that extend from north to south are lined in order of a first road 711, a second road 712, and a third road 713 from west to east. The three roads that extend from east to west are lined in order of a fourth road 714, a fifth road 715, and a sixth road 716 from north to south. The first road 711, the second road, 712, and the third road 713, which extend from north to south, each have the non-contact electric power feeders 400 disposed along the length of each road. As a result, a first feeding lane 721, a second feeding lane 722, and a third feeding lane 723 are formed in the ranges each shown by diagonal lines in FIG. 5.

In FIG. 5, the non-contact electric power feeders 400 provided in the first feeding lane 721 are lower in electric power feed capability than the non-contact electric power feeders 400 provided in the third feeding lane 723. The non-contact electric power feeders 400 provided in the second feeding lane 722 are in a failed state. Hence, the second feeding lane 722 is in the state of being unable to provide non-contact electric power feed to the vehicle 10 (in a non-operating state). Information such as the information about the electric power feed capability of the non-contact electric power feeders 400, and the information on the non-contact electric power feeders 400 in the failed state (information on non-operating state) are transmitted, for example, from the external communication devices 408 of the non-contact electric power feeders 400 to the charging infrastructure information server 300, and managed in the charging infrastructure center. The information is then transmitted from the charging infrastructure information server 300 to the center server 100, the in-vehicle terminal 30, or the like, and is used for guiding recommended routes for the user of the vehicle 10 or for other occasions.

The information creation and provision unit 105 of the center server 100 calculates a predicted remaining battery level from the place of departure 701 to the destination 702 for the route A, the route B and the route C. The predicted remaining battery level is calculated using the SOC information (remaining battery level information) on the vehicle 10 at the place of departure 701, the electric cost information, the map information, the operational information on the non-contact electric power feeders 400, the electric power feed capability information on the non-contact electric power feeders 400, and the like. The electric cost information is information indicating the battery capacity required for the vehicle 10 to travel a unit distance, or the distance that the vehicle 10 can travel per unit battery capacity. The vehicle information management unit 102 stores the electric cost information for each vehicle model. Accordingly, it is possible to read the electric cost information for the pertinent vehicle model by identifying the vehicle ID. The information creation and provision unit 105 acquires the electric cost information on the vehicle 10 from the electric cost information stored in the vehicle information management unit 102.

The information creation and provision unit 105 also calculates basic travel time (without consideration to congestion) from the place of departure 701 to the destination 702 for the route A, the route B and the route C. The basic travel time can be calculated, for example, based on the distance and the predicted vehicle speed between respective points.

In the present embodiment, as a recommended route from the place of departure 701 to the destination 702, different routes are derived depending on the remaining battery level (SOC) of the battery 20 of the vehicle 10. In other words, when the vehicle 10 is at low SOC indicating that the remaining battery level of the vehicle 10 is a first remaining battery level, a first route C1, including the third road 713 provided with the non-contact electric power feeder 400 with high electric power feed capability, is derived. When the vehicle 10 is at middle SOC indicating that the remaining battery level of the vehicle 10 is a second remaining battery level that is higher than the case of the low SOC corresponding to the first remaining battery level, a second route C2, including the first road 711 provided with the non-contact electric power feeder 400 with low electric power feed capability, is derived.

The first route C1 is a route in which the vehicle 10 travels from the place of departure 701 through a connecting path 731 (first connecting path) to the third road 713, travels along the third road 713 and the fourth road 714, and enters a connecting path 741 (third connecting path) from the fourth road 714 to reach the destination 702. In the first route C1, the non-contact electric power feeder 400 has high electric power feed capability (first electric power feed capability) in the third feeding lane 723 provided on the third road 713. When non-contact charging of the vehicle 10 is performed while the vehicle 10 is traveling on the third feeding lane 723, the vehicle 10 is made to travel on the third feeding lane 723 at speeds lower than a normal travel speed. For example, the first route C1 is guided as the recommended route for the vehicle 10 at low SOC which requires non-contact charging at some point from the place of departure 701 to the destination 702 based on the predicted remaining battery level calculated by the information creation and provision unit 105 of the center server 100. This allows the vehicle 10 at low SOC to reach the destination 702 from the place of departure 701 with priority given to electric power feeding.

The second route C2 is a route in which the vehicle 10 travels from the place of departure 701 through a connecting path 732 (second connecting path) to the second road 712, travels along the second road 712, the sixth road 716 and the first road 711, and enters a connecting path 742 (fourth connecting path) from the first road 711 to reach the destination 702. In the second route C2, the non-contact electric power feeder 400 has a low electric power feed capability (second electric power feed capability) in the first feeding lane 721 provided on the first road 711. When non-contact charging of the vehicle 10 is performed while the vehicle 10 is traveling on the first feeding lane 721, the vehicle 10 is made to travel at higher speeds than when the vehicle 10 travels on the third feeding lane 723. For example, the second route C2 is guided as the recommended route for the vehicle 10 at middle SOC which requires non-contact charging at some point from the place of departure 701 to the destination 702 based on the predicted remaining battery level calculated by the information creation and provision unit 105 of the center server 100. This allows the vehicle 10 at middle SOC to reach the destination 702 from the place of departure 701 with priority given to vehicle speed or shorter arrival time.

Thus, in the present embodiment, when there is a road including feeding lanes provided with the non-contact electric power feeders 400 different in electric power feed capability, that is, having a low electric power feed capability and a high electric power feed capability, a third route C3 including the non-contact electric power feeder 400 with the high electric power feed capability can be guided to the vehicle 10 at low SOC. This makes it possible to increase the electric power to be fed to the vehicle 10 at low SOC.

The third route C3 is a route in which the vehicle 10 travels from the place of departure 701 through a connecting path 733 to the sixth road 716, travels along the sixth road 716, the second road 712, and the fifth road 715, and enters a connecting path 743 from the fifth road 715 to reach the destination 702. In the third route C3, the non-contact electric power feeders 400 provided on the second road 712 constituting the second feeding lane 722 are in the failed state. Hence, the vehicle 10 is unable to receive non-contact charging while traveling on the second feeding lane 722. Accordingly, for example, based on the predicted remaining battery level calculated by the information creation and provision unit 105 of the center server 100, the third route C3 is derived as the recommended route for the vehicle 10 at high SOC corresponding to a third remaining battery level that is higher than the case of the middle SOC corresponding to the second remaining battery level, without the necessity of non-contact charging at some point from the place of departure 701 to the destination 702. Meanwhile, the third route C3 is not derived as the recommended route for the vehicle 10 at low SOC and the vehicle 10 at middle SOC which require non-contact charging at some point from the place of departure 701 to the destination 702.

In the third route C3, non-contact charging of the vehicle 10 is not performed in the second feeding lane 722 where the non-contact electric power feeder 400 is in the failed state. Therefore, the vehicle 10 is made to travel at higher speeds than the speeds in the first feeding lane 721 and the third feeding lane 723. This allows the vehicle 10 at high SOC to reach the destination 702 from the place of departure 701 faster.

In the present embodiment, when route guidance including the place of departure 701 is provided, the routes passing the different connecting paths 731, 732, 733 as exits from the place of departure 701 to the adjacent roads are selected depending on the remaining battery level (SOC) of the vehicle 10. Specifically, the first route C1 guided in the case of the vehicle 10 at low SOC includes the connecting path 731 connecting the place of departure 701 with the third road 713 adjacent to the place of departure 701. The second route C2 guided in the case of the vehicle 10 at middle SOC includes the connecting path 732 connecting the place of departure 701 with the second road 712 adjacent to the place of departure 701. The third route C3 guided in the case of the vehicle 10 at high SOC includes the connecting path 733 connecting the place of departure 701 with the sixth road 716 adjacent to the place of departure 701. This makes it possible to restrain the vehicles 10 to concentrate on particular connecting paths when the vehicles 10 go out to the roads from the place of departure 701, and to thereby restraining congestion of the connecting paths or the roads in the vicinity of the connecting paths.

In the present embodiment, when route guidance including the destination 702 is provided, the routes passing the different connecting paths 741, 742, 743 as entrances to the destination 702 from the adjacent roads are selected depending on the remaining battery level (SOC) of the vehicle 10. Specifically, the first route C1 guided in the case of the vehicle 10 at low SOC includes the connecting path 741 connecting the fourth road 714 adjacent to the destination 702 with the destination 702. The second route C2 guided in the case of the vehicle 10 at middle SOC includes the connecting path 742 connecting the first road 711 adjacent to the destination 702 with the destination 702. The third route C3 guided in the case of the vehicle 10 at high SOC includes the connecting path 743 connecting the fifth road 715 adjacent to the destination 702 with the destination 702. This makes it possible to restrain the vehicles 10 from concentrating on particular connecting paths when the vehicles 10 enters the destination 702 from the roads, and to thereby restrain congestion of the connecting paths or the roads in the vicinity of the connecting paths.

On the roads in the vicinity of the intersections, the vehicles 10 are more likely to become relatively close to each other because the vehicles 10 slow down due to traffic lights or changing directions. Therefore, on the roads in the vicinity of the intersections, the vehicles 10 can be made to travel at relatively low speeds with priority given to electric power feeding. Meanwhile, on the roads connected to the roads in the vicinity of the intersections, that is, on the roads other than the roads in the vicinity of the intersections, congestion may occur when the vehicles 10 are made to travel at relatively low speeds same as the speeds on the roads in the vicinity of the intersections. Therefore, in the present embodiment, when any intersection is included on the road that constitutes the feeding lane in the recommended route, a recommended speed may be instructed to the user so as to set the speed of the vehicle 10, other than in the vicinity of the intersection, to be higher than the speed of the vehicle 10 in the vicinity of the intersection. This allows the vehicle 10 to prioritize the non-contact charging in the vicinity of the intersections, while restraining the occurrence of traffic congestion.

Back to FIG. 4, the center server 100 transmits in step S23 the recommended route and detailed information on the recommended route to the in-vehicle terminal 30, and ends the routine. The detailed information related to the recommended route includes information indicating the predicted remaining battery level, predicted traveling time, and recommended vehicle speed when the vehicle 10 passes through the feeding lane.

When the in-vehicle terminal 30 receives the recommended route and the detailed information from the center server 100, the in-vehicle terminal 30 temporarily stores the recommended route and the detailed information in a memory and displays the recommended route and the detailed information on the display unit 32 in step S12. In this case, the display unit 32 that displays the recommended route displays the non-contact electric power feed position, and the congestion status, as well as the predicted remaining battery level and predicted traveling time at the destination 702.

In step S13, when the operation unit 33 receives input of the user to select the recommended route, the in-vehicle terminal 30 starts route guidance in step S14 to travel along the recommended route. In other words, the navigation control unit 312 starts navigation from the place of departure 701 to the destination 702. Once the navigation is started, the routine is ended. When no input is made by the user to select the recommended route after the lapse of a certain amount of time since the recommended route is displayed on the display unit 32, the in-vehicle terminal 30 ends the display of the recommended route. When the vehicle 10 includes an autonomous driving function that allows autonomous driving from the place of departure 701 to the destination 702, the vehicle 10 is made to travel autonomously based on the recommended route transmitted from the center server 100 to the in-vehicle terminal 30 or the like.

The navigation control unit 312 of the in-vehicle terminal 30 repeatedly determines whether the vehicle 10 is out of the recommended route during navigation. When the vehicle 10 is out of the recommended route, the navigation control unit 312 restarts the travel route suggestion control routine, and transmits a recommended route request command to the center server 100. In this case, the place of departure is the position of the own vehicle at the time when the vehicle 10 is out of the recommended route and the travel route suggestion control routine is restarted.

Moreover, since information indicating the recommended vehicle speed is transmitted to the in-vehicle terminal 30, the in-vehicle terminal 30 can include the following functions. For example, the in-vehicle terminal 30 may include a device (recommended vehicle speed suggestion device) that announces the recommended vehicle speed to the user using the display unit 32 or the sound generation unit 34 before the vehicle 10 passes the non-contact electric power feed position during navigation. In this case, when the own vehicle position detected by the vehicle position detector 36 is the position before the non-contact electric power feed position by a set distance (set distance for announcement), the in-vehicle terminal 30 announces to drive at recommended speed (e.g., lower speed than usual travel speed) by using the display unit 32 or the sound generation unit 34. This allows the user to maintain the recommended vehicle speed to ensure appropriate battery charging.

In the embodiment, for example, the recommended route and the detailed information may be provided to the user by using a mobile terminal 600 that is a mobile communication terminal device shown in FIG. 1 in place of the in-vehicle terminal 30. For example, a smartphone associated with the vehicle 10 can be used as the mobile terminal 600.

Figure 6:
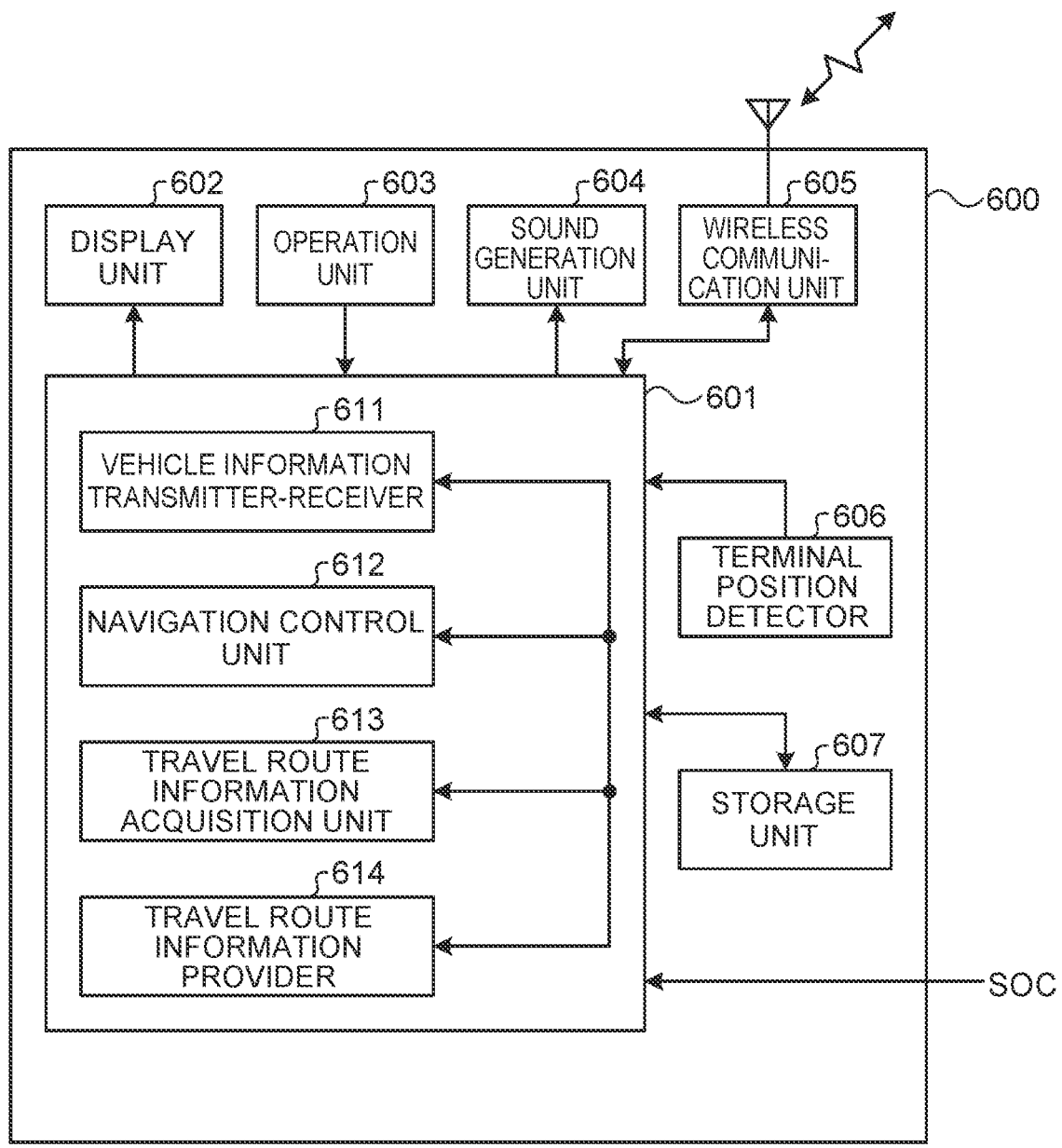
FIG. 6 is a schematic configuration diagram of a mobile terminal.

In this case, the mobile terminal 600 is configured to include the same functions as the in-vehicle terminal 30. For example, as shown in FIG. 6, the mobile terminal 600 includes a main control unit 601, a display unit 602, an operation unit 603, a sound generation unit 604, a wireless communication unit 605, a terminal position detector 606 and a storage unit 607. The display unit 602, the operation unit 603, the sound generation unit 604, and the storage unit 607 are identical to the display unit 32, the operation unit 33, the sound generation unit 34, and the storage unit 37 of the in-vehicle terminal 30. In addition to the function to communicate with the outside via the communication network 500, the wireless communication unit 605 also has the function to perform short-distance wireless communication (e.g., Bluetooth (registered trademark), and Wi-Fi) with the in-vehicle terminal 30. The terminal position detector 606 detects the current position coordinates of the mobile terminal 600 based on radio waves from GPS satellites.

The main control unit 601 includes, as main components, a microcomputer including a processor that is constituted of a CPU, an FPGA or the like and a memory that is constituted of a RAM, a ROM or the like. The main control unit 601 includes, in view of functional classification, a vehicle information transmitter-receiver 611, a navigation control unit 612, a travel route information acquisition unit 613, and a travel route information provider 614. The navigation control unit 612, the travel route information acquisition unit 613, and the travel route information provider 614 are identical to the navigation control unit 312, the travel route information acquisition unit 313, and the travel route information provider 314 of the in-vehicle terminal 30. The vehicle information transmitter-receiver 611 includes the function to communicate with the in-vehicle terminal 30 to receive vehicle information (remaining battery level, etc.) from the in-vehicle terminal 30, and the function to transmit the vehicle information to the center server 100.

In the mobile terminal 600, the storage unit 607 stores an application program for executing the travel route suggestion control routine, and the main control unit 601 executes the application program. When the mobile terminal 600 executes the travel route suggestion control routine, the mobile terminal 600 may read the remaining battery level from the in-vehicle terminal 30 and use the position of the mobile terminal instead of the position of the own vehicle, or may read the own vehicle position from the in-vehicle terminal 30. The mobile terminal 600 can perform other processing operations in the same way as the in-vehicle terminal 30 does.

In this way, the car navigation system using the mobile terminal 600 can also achieve the same effects as in the case of using the in-vehicle terminal 30. In addition, since the in-vehicle terminal 30 does not need the configuration for wireless communication with the center server 100, cost reduction can be achieved.

In the present embodiment, the center server 100 is configured to obtain the recommended route. However, the in-vehicle terminal 30 or the mobile terminal 600 may be configured to obtain the recommended route. In this case, the in-vehicle terminal 30 or the mobile terminal 600 may include a recommended route setting unit instead of the travel route information acquisition unit 313, and the recommended route setting unit may be configured to calculate the recommended route from the place of departure 701 to the destination 702.

The present embodiment is configured to provide the recommended route and detailed information to the user. However, it is not necessarily needed to provide the detailed information. Only the recommended route may be provided.

Further effects and modifications can easily be derived by those skilled in the art. Broader aspects of the present disclosure are not limited to the specific details and typical embodiments as expressed and described above. Therefore, various modifications are possible, without departing from the spirit or the scope of the overall concept of the disclosure that is defined by the following claims and any equivalents thereof.

What is claimed is:

1. A navigation server, comprising a processor, the processor being configured to
derive one of a first route, a second route and a third route as a route from a place of departure to a destination of a vehicle in accordance with a remaining level of a travel battery of the vehicle, the first route including a first road provided with a first non-contact electric power feeder, the second route including a second road provided with a second non- contact electric power feeder that is different in electric power feed capability from the first non-contact electric power feeder, the third route including a third road provided with a non-contact electric power feeder that is not in operation, the first non-contact electric power feeder having higher electric power feed capability than the second non-contact electric power feeder,
derive the first route when the remaining level of the travel battery of the vehicle is a first remaining battery level,
derive the second route when the remaining level of the travel battery of the vehicle is a second remaining battery level that is larger than the first remaining battery level,
derive the third route when the remaining level of the travel battery of the vehicle is a third remaining battery level that is larger than the second remaining battery level, and
output one of the derived first route, second route and third route as a recommended route to a terminal associated with the vehicle.

2. The navigation server according to claim 1, wherein:
the first route includes a first connecting path connecting the place of departure with a road adjacent to the place of departure; and
the second route includes a second connecting path connecting the place of departure with a road adjacent to the place of departure.

3. The navigation server according to claim 1, wherein:
the first route includes a third connecting path connecting a road adjacent to the destination with the destination; and
the second route includes a fourth connecting path connecting a road adjacent to the destination with the destination.

4. The navigation server according to claim 1, wherein the processor is configured to
derive a first recommended speed of the vehicle in a vicinity of an intersection on the first road or the second road,
derive a second recommended speed that is higher than the first recommended speed of the vehicle other than in the vicinity of the intersection, and
output the first recommend speed and the second recommended speed to the terminal.

5. The navigation server according to claim 1, wherein the non-contact electric power feeder that is not in operation is in a failed state.

6. A non-transitory storage medium storing instructions that are executable by a processor and that cause the processor to perform functions comprising:
deriving one of a first route, a second route and a third route as a route from a place of departure to a destination of a vehicle in accordance with a remaining level of a travel battery of the vehicle, the first route including a first road provided with a first non-contact electric power feeder, the second route including a second road provided with a second non-contact electric power feeder that is different in electric power feed capability from the first non-contact electric power feeder, the third route including a third road provided with a non-contact electric power feeder that is not in operation, the first non-contact electric power feeder having higher electric power feed capability than the second non-contact electric power feeder;
deriving the first route when the remaining level of the travel battery of the vehicle is a first remaining battery level;
deriving the second route when the remaining level of the travel battery of the vehicle is a second remaining battery level that is larger than the first remaining battery level;
deriving the third route when the remaining level of the travel battery of the vehicle is a third remaining battery level that is larger than the second remaining battery level; and
outputting one of the derived first route, second route and third route as a recommended route to a terminal associated with the vehicle.

7. The non-transitory storage medium according to claim 6, wherein:
the first route includes a first connecting path connecting the place of departure with a road adjacent to the place of departure; and
the second route includes a second connecting path connecting the place of departure with a road adjacent to the place of departure.

8. The non-transitory storage medium according to claim 6, wherein:
the first route includes a third connecting path connecting a road adjacent to the destination with the destination; and
the second route includes a fourth connecting path connecting a road adjacent to the destination with the destination.

9. The non-transitory storage medium according to claim 6, wherein the functions further comprising:
deriving a first recommended speed of the vehicle in a vicinity of an intersection on the first road or the second road;
deriving a second recommended speed that is higher than the first recommended speed of the vehicle other than in the vicinity of the intersection; and
outputting the first recommend speed and the second recommended speed to the terminal.

10. The non-transitory storage medium according to claim 6, wherein the non-contact electric power feeder that is not in operation is in a failed state.

11. A navigation system, comprising:
a terminal associated with a vehicle, the terminal including a first processor; and
navigation server having a second processor, the second processor being configured to
derive one of a first route, a second route and a third route as a route from a place of departure to a destination of the vehicle in accordance with a remaining level of a travel battery of the vehicle, the first route including a first road provided with a first non-contact electric power feeder, the second route including a second road provided with a second non- contact electric power feeder that is different in electric power feed capability from the first non-contact electric power feeder, the third route including a third road provided with a non-contact electric power feeder that is not in operation, the first non-contact electric power feeder having higher electric power feed capability than the second non-contact electric power feeder,
derive the first route when the remaining level of the travel battery of the vehicle is a first remaining battery level,
derive the second route when the remaining level of the travel battery of the vehicle is a second remaining battery level that is larger than the first remaining battery level, derive the third route when the remaining level of the travel battery of the vehicle is a third remaining battery level that is larger than the second remaining battery level, and output one of the derived first route, second route and third route as a recommended route to the terminal associated with the vehicle.

12. The navigation system according to claim 11, wherein:

the first route includes a first connecting path connecting the place of departure with a road adjacent to the place of departure; and the second route includes a second connecting path connecting the place of departure with a road adjacent to the place of departure.

13. The navigation system according to claim 11, wherein:

the first route includes a third connecting path connecting a road adjacent to the destination with the destination; and the second route includes a fourth connecting path connecting a road adjacent to the destination with the destination.

14. The navigation system according to claim 11, wherein the second processor is configured to derive a first recommended speed of the vehicle in a vicinity of an intersection on the first road or the second road derive a second recommended speed that is larger than the first recommended speed of the vehicle other than in the vicinity of the intersection, and output the first recommend speed and the second recommended speed to the terminal.

* * * * *